S. P. CAMPBELL.
Harrow.
No. 41,479.   Patented Feb. 9, 1864.
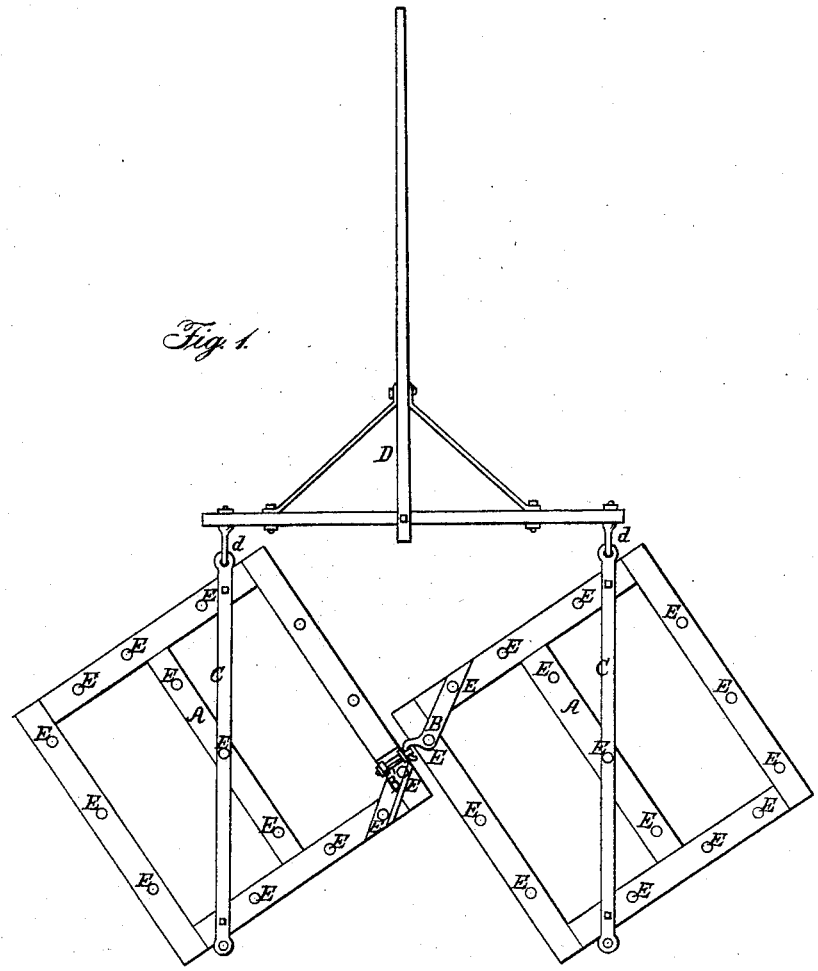
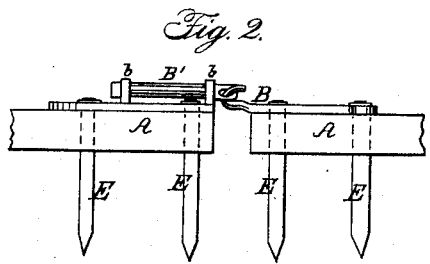
Witnesses:   Inventor:

UNITED STATES PATENT OFFICE.

STILLMAN P. CAMPBELL, OF ROCHESTER, MINNESOTA.

IMPROVEMENT IN HARROWS.

Specification forming part of Letters Patent No. 41,479, dated February 9, 1864.

*To all whom it may concern:*

Be it known that I, STILLMAN P. CAMPBELL, of Rochester, in the county of Olmsted and State of Minnesota, have invented a new and Improved Mode of Constructing Harrows; and I do hereby declare that the following is a full, clear, and exact description of the construction and operation of the same, reference being had to the annexed drawings, making a part of this specification, in which—

Figure 1 is a plan view of the harrow in complete connection for work. Fig. 2 is a side view of the coupling for joining the two sections. Fig. 3 is a side view of the tongue attachment.

My invention consists in so constructing and attaching two or more harrows as to secure a more uniform and perfect operation than can be attained by any ordinary method.

That others skilled in the art may be enabled to make and use my invention, I will proceed to describe its construction and operation.

A A are two harrows of ordinary construction, and preferably square.

B and B' is the coupling which joins them to each other.

C is a strap, which is attached to the upper side of the harrow, crossing its central point. The ends of the strap C are perforated, and serve as the connection with the tongue D, which is provided with the hooks $d$ $d$ for the purpose of connecting with the ends of the strap C.

E and E are the harrow-teeth, so disposed that their furrows are all equidistant, as shown by the red lines of Fig. 1.

The part B of the coupling consists of a hook, as shown in Figs. 1 and 2, which I prefer to make long enough to stretch across the corners of the frame, as represented, thereby greatly strengthening the frame.

The part B' is composed of a swivel, which passes through holes in the arms $b$ $b$, and attached to a plate which strengthens the corner in the same manner as the plate B. The swivel B' is provided with a hole through one end, and revolves freely on its axis. The hook B passes through the hole in the swivel, thereby forming a universal joint, which allows the sections of the harrow to move in any direction. The cross-bar of the tongue D and the hooks $d$ $d$, when inserted in the holes through the ends of the straps C, connect the sections of the harrow at these points, so that in operation the action of the two sections is uniform, and they always maintain the same relation to each other.

The advantages of my arrangement are, first, a sectional harrow having a perfectly flexible joint, allowing either part to mount over obstructions or pass through depressions without disturbing the action of the other part; and, secondly, in having a harrow provided with a tongue to which horses may be attached—as to a wagon—a method greatly conducive to the safety and durability of the harness, as there is little or no danger of any part of it dragging in the dirt or being stepped upon by the horses; and, thirdly, making a harrow which must necessarily be steady and uniform in its operation, thereby admitting such an arrangement of the harrow-teeth that the furrows are always equidistant from each other; and, fourthly, that the harrow may be drawn with each end alternately foremost, and thus the teeth be made to sharpen themselves by use.

What I claim as my invention, and desire to secure by Letters Patent, is—

1. A sectional harrow provided with a universal-joint coupling composed of a hook, B, on one side and a swivel, B', on the other, or their equivalents, substantially as described.

2. In combination, with a harrow constructed and united as described, the tongue D, when the whole is arranged in the manner and for the purpose set forth.

3. A sectional harrow, the sections of which are united by means of a universal joint, and each section being drawn from its own center, substantially as and for the purpose set forth.

STILLMAN P. CAMPBELL.

In presence of—
THOMAS SCRIVENER, Jr.,
R. D. O. SMITH.